United States Patent [19]

Naramore et al.

[11] Patent Number: 4,780,746
[45] Date of Patent: Oct. 25, 1988

[54] IDLER ROLL

[75] Inventors: Raymond A. Naramore, Penfield; Joseph M. Wing, Ontario, both of N.Y.

[73] Assignee: Xerox Corporation, Stamford, Conn.

[21] Appl. No.: 75,487

[22] Filed: Jul. 20, 1987

[51] Int. Cl.⁴ .............................................. G03G 15/00
[52] U.S. Cl. .............................. 355/35 H; 355/14 SH; 29/116.1; 384/418
[58] Field of Search ............... 384/418, 494, 490, 543, 384/544; 198/843, 836, 803; 193/37; 29/116 R; 355/35 H, 3 R, 145 H

[56] References Cited

U.S. PATENT DOCUMENTS

| | | | |
|---|---|---|---|
| 1,990,806 | 2/1935 | Watson et al. | 384/418 X |
| 3,086,826 | 4/1963 | Gunnell | 384/418 |
| 3,662,927 | 5/1972 | Borman | 226/89 |
| 4,440,295 | 4/1984 | Blackwood-Murray et al. | 198/843 |
| 4,477,126 | 10/1984 | Price | 384/490 |
| 4,477,954 | 10/1984 | Molinatto | 29/116 |
| 4,523,836 | 6/1985 | Nepper et al. | 355/35 H X |

*Primary Examiner*—A. C. Prescott
*Attorney, Agent, or Firm*—H. Fleischer; J. E. Beck; R. Zibelli

[57] ABSTRACT

Roller pairs, including drive rolls and idler rolls, are used to advance a sheet in a printing machine. The idler roller includes a shaft and a sleeve. A bearing, mounted on the shaft, rotatably supports the sleeve. The inner race of the bearing is press fit onto the shaft. The outer race of the bearing is secured to the sleeve to rotate in unison therewith.

4 Claims, 2 Drawing Sheets

IDLER ROLL

This invention relates generally to an electrophotographic printing machine, and more specifically is directed to an idler roll operatively associated with a drive roll for advancing sheets in the printing machine.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner power image is then transferred from the photoconductive member to a copy sheet. The toner particles are heated to permanently affix the powder image to the copy sheet.

High speed commercial printing machines of the foregoing type require a large number of pairs of rollers to advance the copy sheet through the processing stations in the printing machine, and to advance the original document in the document handling unit. Generally the roller pairs include a drive roller and an idler roller resiliently urged into engagement with one another. The idler roller is usually made from a sleeve mounted rotatably on a shaft. Bearings support the sleeve rotatably on the shaft. Many factors influence the manner in which the bearing is mounted on the shaft and sleeve. Some factors are the accuracy required, the speed of rotation, the load requirements, the desired life, and the economics of assembly and the ease of maintenance. Both the inner and outer races of the bearing are held securely in place. This prevents creeping or spinning of the races in the sleeve or on the shaft. Frequently, snap rings are used to secure the inner race to the shaft. A snap ring can also be used to hold the outer race of the bearing against a shoulder on the sleeve. A locking nut can be used ot hold the inner race of a bearing on a tapered shaft. Bearings are also mounted on shafts by means of an eccentric ring, cut on the side of an extended inner race. A set screw holds the bearing in place.

Clearly, various approaches have been devised for mounting bearings on shafts and sleeves. The following disclosures appear to be relevant:

U.S. Pat. No. 3,662,937
Patentee: Borman
Issued: May 16, 1972
U.S. Pat. No. 4,440,295
Patentee: Blackwood-Murray et al.
Issued: Apr. 3, 1984
U.S. Pat. No. 4,477,954
Patentee: Molinatto
Issued: Oct. 23, 1984

The relevant portions of the foregoing patents may be summarized as follows:

Borman discloses a magnetic tape pressure roller. The pressure roller includes a ball bearing race in which is captured a generally spherical steel ball. The ball bearing has a central aperture into which a shaft is pressed. Sleeves are pressed onto the shaft on either side of the ball.

Blackwood-Murray et al. describes an idler roll with a shell of molded plastic. The idler roll is manufactured by mounting a core within a cylindrical mold and positioning bearings within the mold at each end of the core. A plastic material is introduced into the mold and forms a shell around the bearings and core upon curing.

Molinatto discloses a pressure roller including ball bearings. The inner race of each bearing is dynamically coupled to a shaft with the outer race of each bearing being dynamically coupled to a sleeve.

In accordance with one aspect of the present invention, there is provided a roller used to advance a sheet of support material. The roller includes a shaft member and a tubular member. A bearing is adapted to be mounted on the shaft to support the tubular member rotatably. The bearing member has an inner race and an outer race. The inner race is mounted on the exterior surface of the shaft in pressing non-rotative engagement. The outer race is mounted non-rotatively on the interior circumferential surface of the tubular member to surpport the tubular member and rotate in unison therewith.

Pursuant to another aspect of the features of the present invention, there is provided an electrophotographic printing machine of the type in which a drive roller and an idler roller are resiliently urged into engagement with one another to advance a sheet through a nip defined therebetween. The improved idler roller includes a shaft member and a tubular member. A bearing is adapted to be mounted on the shaft to support the tubular member rotatably. The bearing member has an inner race and an outer race. The inner race is mounted on the exterior surface of the shaft in pressing non-rotative engagment. The outer race is mounted non-rotatively on the interior circumferential surface of the tubular member to support the tubular member and rotate in unison therewith.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

Figure 1:
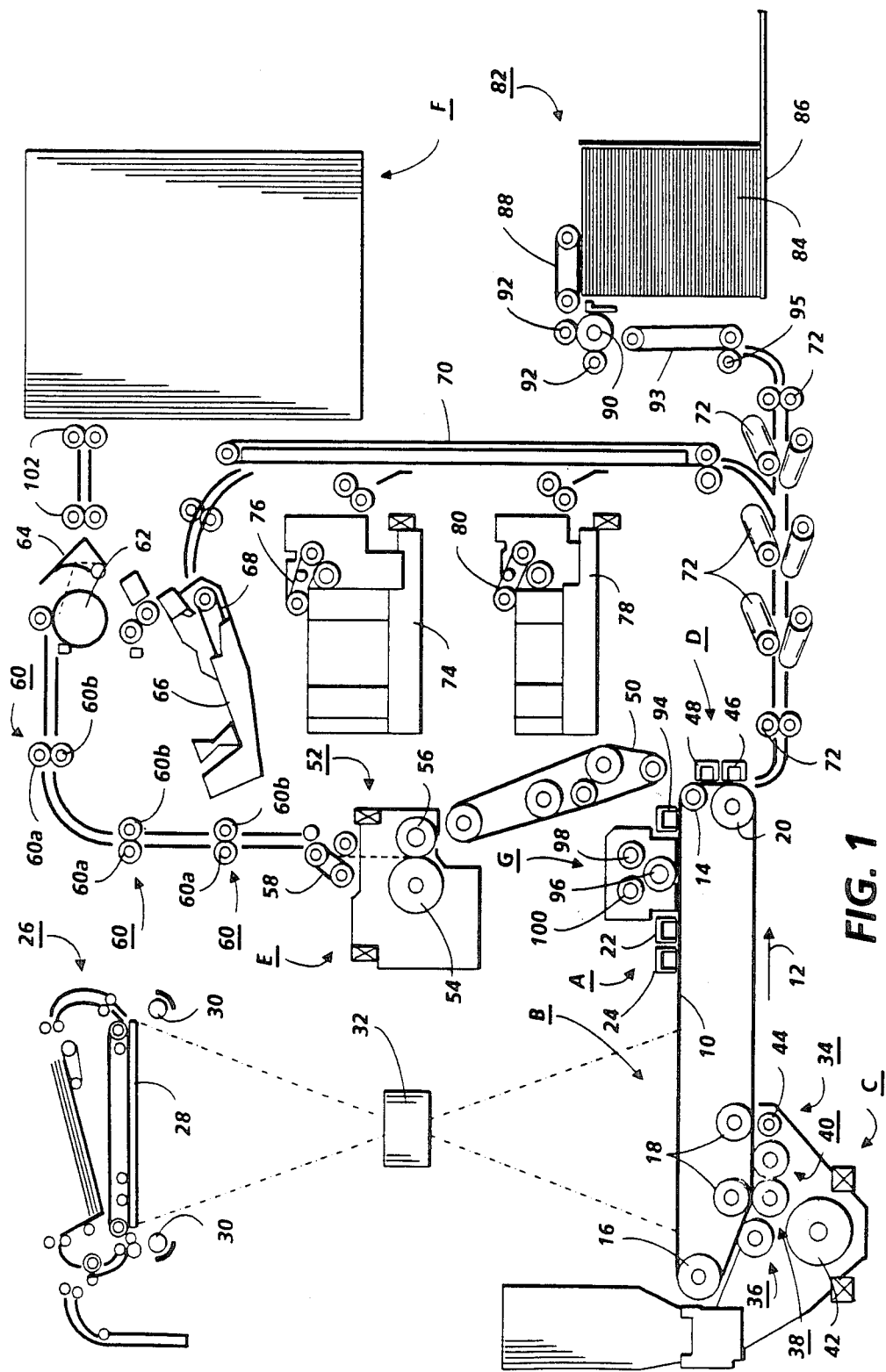
FIG. 1 is a schematic elevational view depicting an illustrative electrophotographic printing machine incorporating the idler roller of the present invention therein.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the idler roller of the present invention may be employed in a wide variety of devices and is not specifically limited in its application to the particular embodiments depicted herein.

Referring to FIG. 1 of the drawings, the electrophotographic printing machine employs a photoconductive belt 10. Preferably, the photoconductive belt 10 is made from a photoconductive material coated on a ground layer, which, in turn, is coated on an anti-curl backing layer. The photoconductive material is made from a transport layer coated on a generator layer. The transport layer transports postive charges from the generator layer. The interface layer is coated on the ground layer. The transport layer contains small molecules of dimtolydiphenylbiphenyldiamine dispersed in a polycarbonate. The generation layer is made from trigonal selenium. The grounding layer is made from a titanium coated Mylar. The ground layer is very thin and allows light to pass therethrough. Other suitable photoconductive materials, ground layers, and anti-curl backing layers may also be employed. Belt 10 moves in the direction of arrow 12 to advance successive portions of the photoconductive surface sequentially through the various processing stations disposed about the path of movement thereof. Belt 10 is entrained about stripping roller 14, tensioning roller 16, rollers 18, and drive roller 20. Stripping roller 14 and rollers 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of photoconductive belt 10 passes through charging station A. At charging station A, two corona generating devices, indicated generally by the reference numerals 22 and 24 charge photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of photoconductive belt 10 is advanced through imaging station B. At imaging station B, a document handling unit, indicated generally by the reference numeral 26, is positioned over platen 28 of the printing machine. Document handling unit 26 sequentially feeds documents from a stack of documents placed by the operator in the document stacking and holding tray. The original documents to be copied are loaded face up into the document tray on top of the document handling unit. A document feeder located below the tray forwards the bottom document in the stack to rollers. The rollers advance the document onto platen 28. When the original document is properly positioned on platen 28, a belt transport is lowered onto the platen with the orginal document being interposed between the platen and the belt transport. After imaging, the original document is returned to the document tray from platen 28 by either of two paths. If a simplex copy is being made or if this is the first pass of a duplex copy, the original document is returned to the document tray via the simplex path. It this is the inversion pass of a duplex copy, then the original document is returned to the document tray through the duplex path. Imaging of a document is achieved by two Xenon flash lamps 30 mounted in the optics cavity which illuminate the document on platen 28. Light rays reflected from the document are transmitted through lens 32. Lens 32 focuses light images of the original document onto the charged portion of the photoconductive surface of belt 10 to selectively dissipate the charge thereon. This records an electrostatic latent image on photoconductive belt 10 which corresponds to the informational areas contained within the original document. Thereafter, photoconductive belt 10 advances the electrostatic latent image recorded thereon to development station C.

At development station C, a magnetic brush developer unit, indicated generally by the reference numbers 34, has three developer rolls, indicated generally by the reference numerals 36, 38 and 40. A paddle wheel 42 picks up developer material and delivers it to the developer rolls. When developer material reaches rolls 36 and 38, it is magnetically split between the rolls with half of the developer material being delivered to each roll. Photoconductive belt 10 is partially wrapped about rolls 36 and 38 to form extended development zones. Developer roll 40 is a cleanup roll. Magnetic roll 44 is a carrier granule removal device adapted to remove any carrier granules adhering to belt 10. Thus, rolls 36 and 38 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detach the copy sheet from belt 10. Conveyor 50 advances the copy sheet to fusing station E.

Fusing station E includes a fuser assembly, indicated generally by the reference numeral 52 which permanently affixes the transferred toner powder image to the copy sheet. Preferably, fuser assembly 52 includes a heated fuser roller 54 and a pressure roller 56 with the powder image on the copy sheet contacting fuser roller 54. The pressure roller is cammed against the fuser roller to provide the necessary pressure to fix the tone powder image to the copy sheet. The fuser roll is internally heated by a quartz lamp. Release agent, stored in a reservoir, is pumped to a metering roll. A trim blade trims off the excess release agent. The release agent is transferred to a donor roll and then to the fuser roll.

After fusing, the copy sheets are fed through a decurler 58. Decurler 58 bends the copy sheet in one direction to put a known curl in the copy sheet and then bends it in the opposite direction to remove that curl.

Forwarding roller pairs 60 then advance the sheet to duplex turn roll 62. Each forwarding roller pair 60 includes a drive roll 6 0a and an idler roll 60b. A spring (not shown) resiliently urges drive roll 60a and idler roll 60b into engagement with one another to define a nip through which the copy sheet advances. The drive roll is an elastomeric roll. Roll pairs of this type may also be used in document handling unit 26 for advancing original documents from the stack to the platen. Further details of idler roll 60b will be described hereinafter with reference to FIGS. 2 and 3.

Duplex solenoid gate 64 guides the sheet to the finishing station F or to duplex tray 66. In the finishing station, the copy sheets are collected in sets with the copy sheets of each set being stapled or glued together. Alternatively, duplex solenoid gate 64 diverts the sheet into duplex tray 66. The duplex tray 66 provides an intermediate or buffer storage for those sheets that have been printed on one side and on which an image will be subsequently printed on the second, opposed side thereof, i.e. the sheets being duplexed. The sheets are stacked in duplex tray 66 face down on top of one another in the order in which they are copied.

In order to complete duplex copying, the simplex sheets in tray 66 are fed, in seriatim, by bottom feeder 68 from tray 66 back to transfer station D via conveyer 70 and rollers 72 for transfer of the toner powder image to the opposed sides of the copy sheets. Inasmuch as successive bottom sheets are fed from duplex tray 66, the proper or clean side of the copy sheet is positioned in contact with belt 10 at transfer station D so that the tone powder image is transferred thereto. The duplex sheet is then fed through the same path as the simplex sheet to be advanced to finishing station F.

Copy sheets are fed to transfer station D from the secondary tray 74 The secondary tray 74 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 76. Sheet feeder 76 is a friction retard feeder utilizing a feed belt and take-away folls to advance successive copy sheets to transport 70 which advances the sheets to rolls 72 and then to transfer station D.

Copy sheets may also be fed to transfer station D from the auxiliary tray 78. The auxiliary tray 78 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 80. Sheet feeder 80 is a friction retard feeder utilizing a feed belt and take-away rolls to advance successive copy sheets to transport 70 which advances the sheets to rolls 72 and then to transfer station D.

Secondary tray 74 and auxiliary tray 78 are secondary sources of copy sheets. A high capacity feeder, indicated generally by the reference numeral 82, is the primary source of copy sheets. High capacity feeder 82 includes a tray 84 supported on an elevator 86. The elevator is driven by a bidirectional motor to move the tray up or down. In the up position, the copy sheets are advanced from the tray to transfer station D. A vacuum feed belt 88 feeds successive uppermost sheets from the stack to a take away roll 90 and rolls 92. The take-away roll 90 and rolls 92 guide the sheet onto transport 93. Transport 93 and roll 95 advance the sheet to rolls 72 which, in turn, move the sheet to transfer station station D.

Invariably, after the copy sheet is separted from the photoconductive surface of belt 10, some residual particles remain adhering thereto. After transfer, photoconductive belt 10 passes beneath corona generating device 94 which charges the residual toner particles to the proper polarity. Thereafter, the precharge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 96 and two de-toning rolls 98 and 100, i.e. waste and reclaim de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the the rear of cleaning station G.

The various machine functions are regulated by a controller. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be acomplished by conventional control switch inputs from the printing machine consoles selected by the operator. Conventional sheet path sensors or switches may be utilized to keep track of the position of the documents and the copy sheets. In addition, the controller regulates the various positions of the gates depending upon the mode of operation selected.

Figure 2:
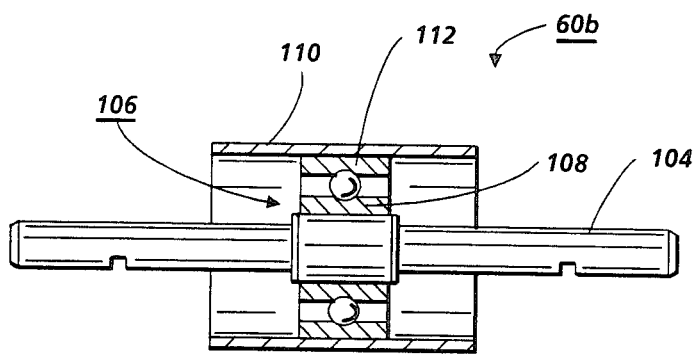
FIG. 2 is an elevational view showing one embodiment of the idler roller used in the FIG. 1 printing machine.

Referring now to FIG. 2, there is shown one embodiment of idler roll 60b. As depicted thereat, idler roller 60b includes a shaft 104 having inner race 106 of bearing 108 press fit onto the mid-portion thereof. A sleeve or tubular member 110 is press fit onto the outer race 112 of bearing 106. In this way, the sleeve rotates in unison with the outer race of the bearing. The press or interference fit between the outer circumferential surface of the outer race and the inner circumferential surface of the sleeve prevents the sleeve from rotating relative to the outer race. Thus, the outer race rotates in unison with the sleeve. The press or interference fit between the inner circumferential surface of the inner race and the outer circumferential surface of the shaft prevent the inner race from rotating relative to the shaft. Preferably, sleeve 110 is made from aluminum with shaft 104 being made from steel. Bearing 106 is preferably an ABEC 1 class ball bearing. The interference fit between the outer race and the sleeve, and the inner race and the shaft preferably ranges from about 0.00025 centimeters to about 0.00075 centimeters.

Figure 3:
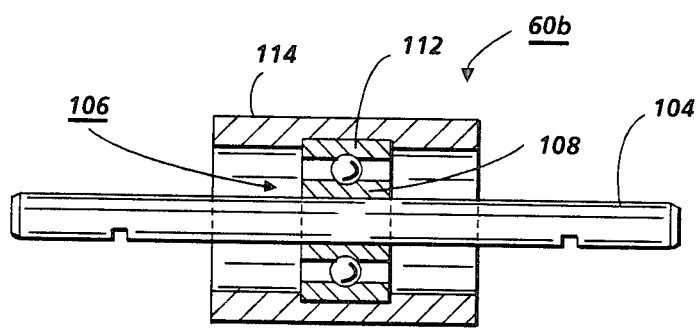
FIG. 3 is an elevational view illustrating another embodiment of the idler roller used in the FIG. 1 printing machine.

Turning now to FIG. 3, there is shown another embodiment of idler roll 60b. In the embodiment illustrated in FIG. 3, bearing 106 has its' outer race in molded non-rotative engagement with sleeve 114. Bearing 106 is automatically inserted into a suitable mold and the sleeve material is injected therein. Upon curing, the sleeve with the bearing molded integrally therewith is removed from the mold. In this way, sleeve 114 is molded around outer race 112 of bearing 106 in such a way as to capture it. This prevents movement of the sleeve relative to the outer race. Thus, the outer race of the bearing and the sleeve rotate in unison with one another. Thereafter, shaft 104 is press fit into the inner race 108 of bearing 106. The press or interference fit between the inner circumferential surface of the inner race and the outer circumferential surface of the shaft prevents the inner race from rotating relative to the shaft. Preferably, sleeve 110 is made from a plastic material with shaft 104 being made from steel. Bearing 106 is preferably an ABEC 1 class ball bearing. The interference fit between the inner race and the shaft preferably ranges from about 0.00025 centimeters to about 0.00075 centimeters. By way of example, the plastic sleeve may be made from any thermoplastic, reinforced thermoplastic or thermoset material. Preferably, sleeve 114 is made from a polyamide containing 15% by weight of carbon fibers therein and 25% by weight of glass fibers therein. This material results in low hoop stress after molding and has good creep and solvent resistance, and good dimensional stability. Other suitable materials are an acetal resin, a glass filled polycarbonate, a glass filled polyester, a thermoplastic elastomer, a polyamide containing 30% by weight of carbon fibers, and a polyamide containing 50% by weight of glass fibers. All of these materials readily lend themselves to being molded so as to form the outer race of the bearing in non-rotative engagement with the sleeve.

In recapitulation, the idler roll of the present invention includes a shaft and a sleeve with a bearing having its inner race press fit onto the shaft. The outer race of the bearing is in non-rotative engagment with the sleeve. The sleeve may either be press fit onto the outer race of the bearing or molded integrally therewith.

It is, therefore, evident that there has been provided, in accordance with the present invention, an idler roller that fully satisfies the aims and advantages hereinbefore set forth. While this invention has been described inconjunction with various embodiments thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A roller used to advance a sheet of support material, including:
    a shaft member;
    a tubular member; and
    a bearing member adapted to be mounted on said shaft member to support said tubular member rotatably, said bearing member having an inner race mounted on the exterior surface of said shaft member in pressing non-rotative engagement therewith and an outer race secured to the interior circumferential surface of said tubular member to support said tubular member and rotate substantially in unison therewith, said tubular member being a molded member with the outer race of said bearing member being molded in nonrotative engagement therewith.

2. A roller according to claim 1, wherein said molded member is made preferably from a plastic material.

3. An electrophotographic printing machine of the type in which a drive roller and an idler are resiliently urged into engagement with one another to advance a sheet through a nip defined therebetween, wherein the improved idler roller includes:
    a shaft member;
    a tubular member; and
    a bearing member adapted to be mounted on said shaft member to support said tubular member rotatably, said bearing member having an inner race mounted on the exterior surface of said shaft member in pressing non-rotative engagement therewith and an outer race secured to the interior circumferential surface of said tubular member to support said tubular member and rotate substantially in unison therewith, said tubular member being a molded member with the outer race of said bearing member being molded in non-rotative engagement therewith.

4. A printing machine according to claim 3, wherein said molded member is made preferably from a plastic material.

* * * * *